July 27, 1948.  H. TSAI ET AL  2,445,980
TRAP DEVICE FOR RODENTS
Filed Jan. 10, 1946  5 Sheets-Sheet 1
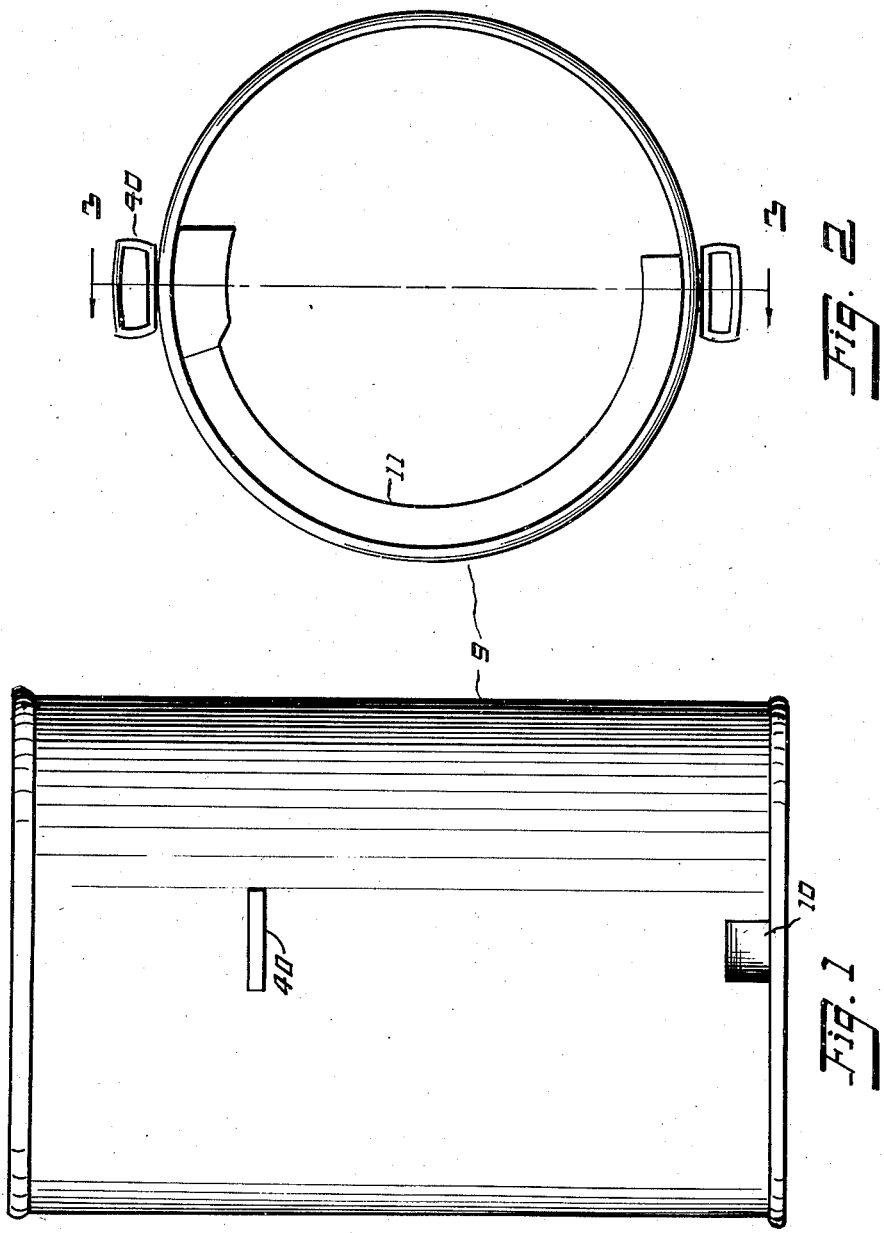
INVENTORS
Nicholas Chuy
Rev. Herbert Tsai

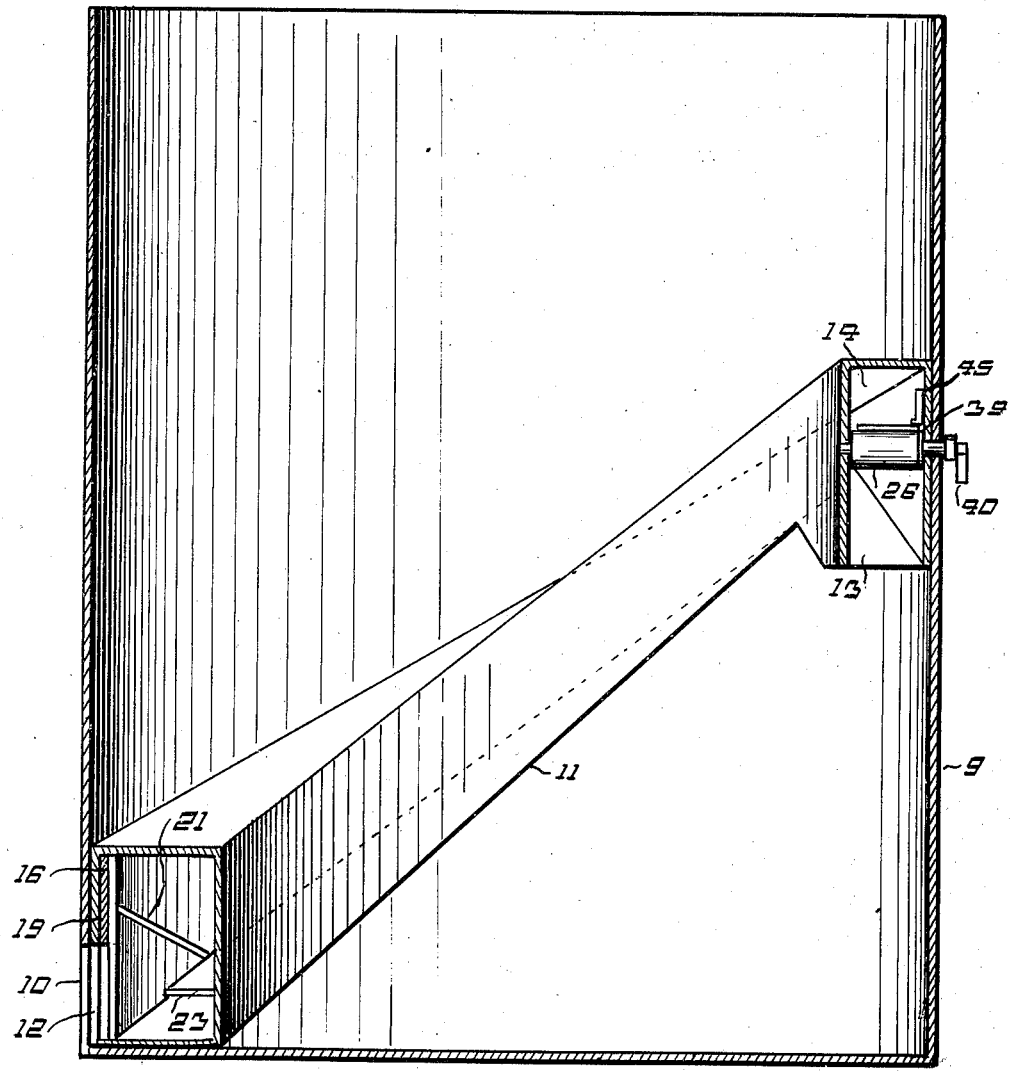

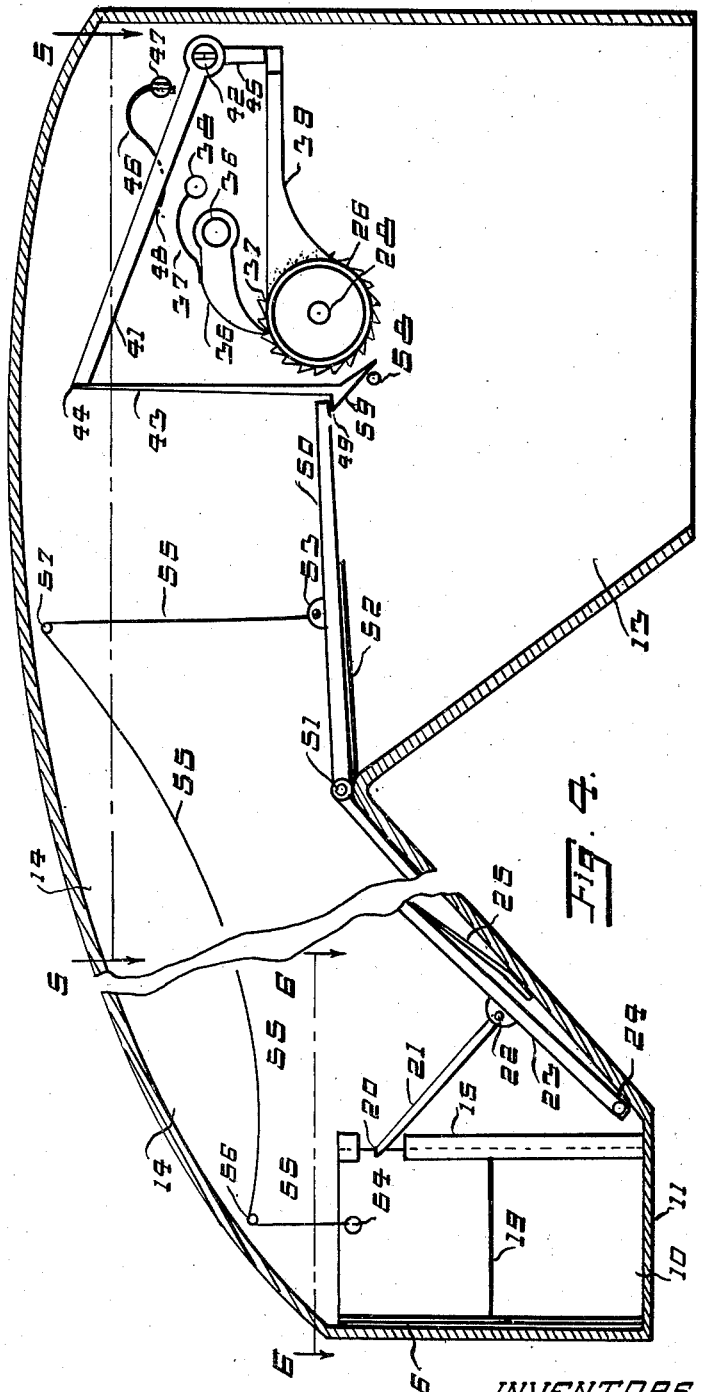

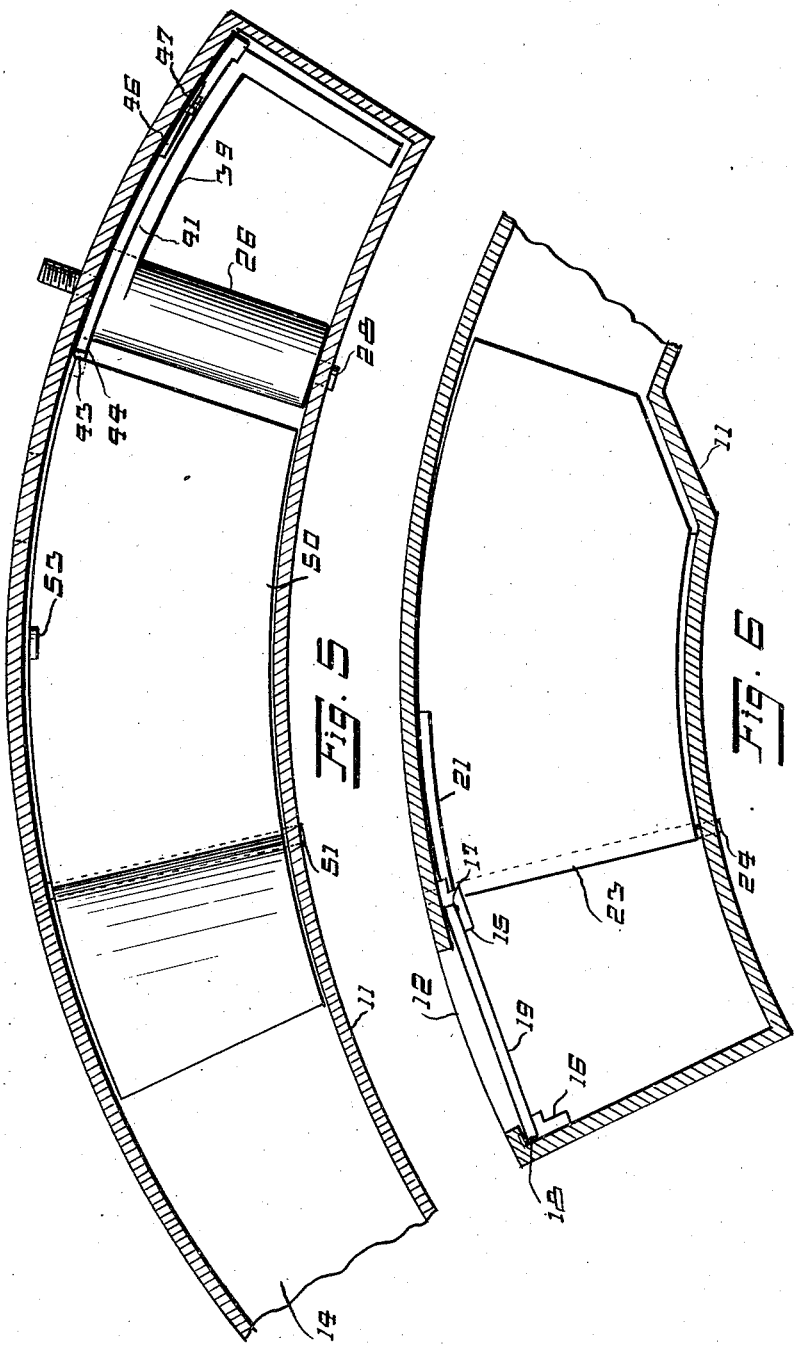

July 27, 1948.  H. TSAI ET AL  2,445,980
TRAP DEVICE FOR RODENTS
Filed Jan. 10, 1946  5 Sheets-Sheet 5
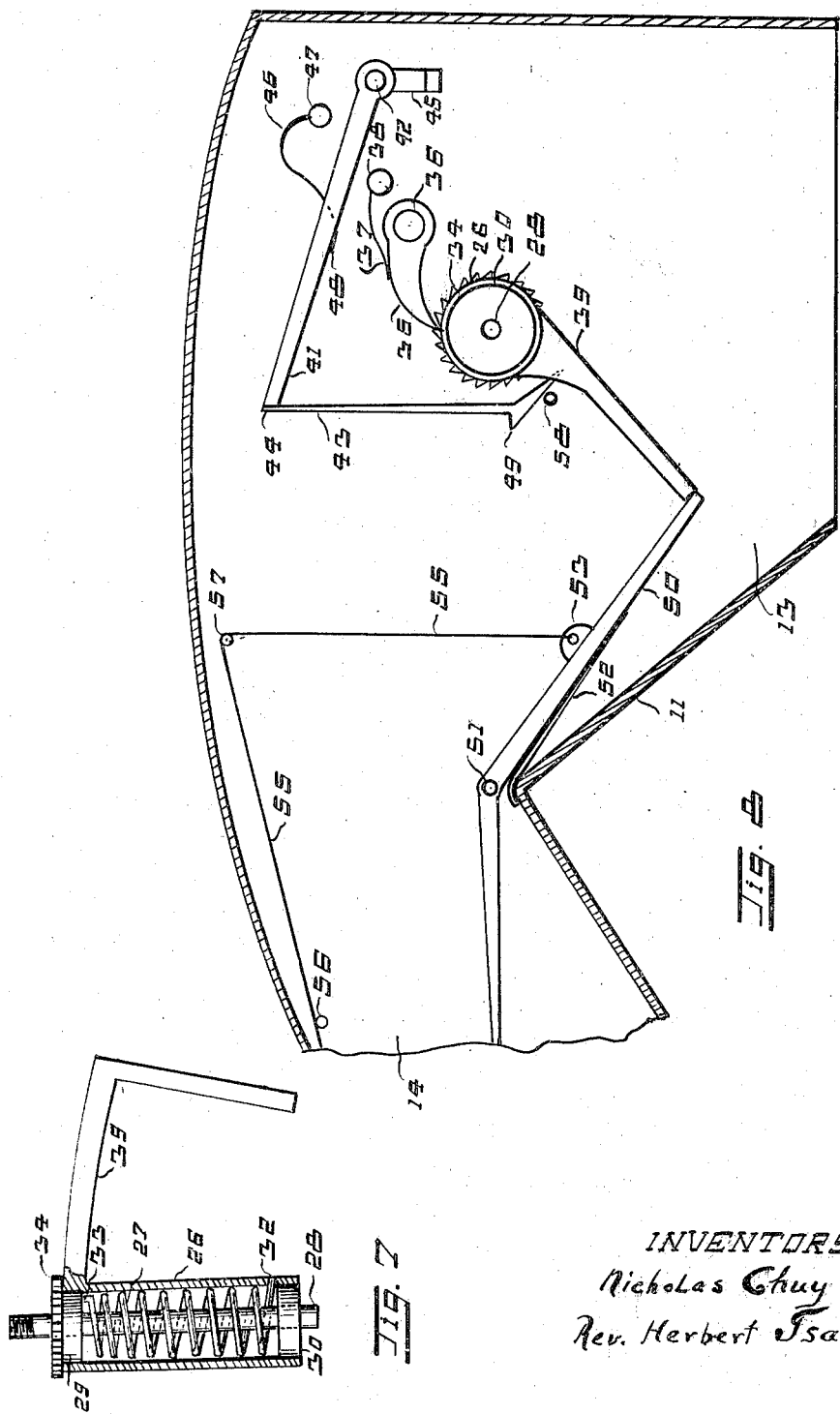
INVENTORS
Nicholas Chuy
Rev. Herbert Tsai

UNITED STATES PATENT OFFICE 2,445,980

TRAP DEVICE FOR RODENTS

Herbert Tsai and Nicholas Chuy, Detroit, Mich., assignors to Herbnick Manufacturing and Engineering Company, Incorporated, Detroit, Mich.

Application January 10, 1946, Serial No. 640,254

7 Claims. (Cl. 43—77)

This invention relates to receptacles, such as cans or barrels, which are exclusively used for the purpose of disposing of waste and garbage.

The object of our invention is to provide a garbage receptacle of such construction that aside from being used for depositing waste and garbage therein, it also is used as an exterminator of rodents which find their main source of food therefrom; and the advantages obtained from such invention is that it improves sanitation, prevents distribution and the spreading of various contagious diseases which such rodents invariably carry.

Another object of the invention is to provide a mechanism in the interior of the garbage receptacle of such construction that it may be set, at one time, to exterminate several rodents successively before the resetting thereof would be necessary.

Still another object of the invention is to provide a mechanism of such construction that each rodent, after its extermination, is automatically ejected from the zone of the impacting member thereof, for the purpose of providing clearance for the subsequent rodents.

Other objects and advantages of the invention will become more fully apparent from a consideration of the following description taken in conjunction with the accompanying drawings, in which:

Figure 1 is a view in elevation of a fully assembled garbage receptacle showing an entrance for rodents.

Figure 2 is a plan view of a garbage receptacle showing the trap casing assembled thereto.

Figure 3 is an enlarged cross-sectional view of the garbage receptacle, taken on the line 3—3 of Figure 2, showing the assembly of the trap in the interior of said garbage receptacle.

Figure 4 is an enlarged view of the detail of the trap designated in Figure 3 showing the casing thereof in section to disclose its operative mechanism.

Figure 5 is a fragmentary detail, taken on the line 5—5 of Figure 4, showing the position of an arm which, by its impact against the platform, exterminates the rodent.

Figure 6 is a fragmentary detail, in cross-section, taken on the line 6—6 of Figure 4, showing the entrance, the trap door, and the trap platform associated therewith.

Figure 7 is a cross-sectional view of the casing of the arm, showing the spring which provides force to actuate said arm.

Figure 8 is a sectional view of a fragmentary detail showing the direction of movement of the platform, when the arm is impacted against it.

Referring specifically to the drawings wherein like reference characters designate like or similar parts, the trap proper is housed within the garbage barrel 9 which is provided at its base with an opening 10 through which rodents enter into the passage which communicates with mechanism provided therein for the extermination of rodents.

Reverting to the trap, it has a hollow casing 11 projecting spirally against the inner periphery of the said barrel 9. This casing 11 is preferably cast of light metal, such as aluminum or other suitable material. The lower end of said casing 11 has an opening 12 which is in alignment with the opening 10 of the garbage barrel 9. The opposite end of the casing 11 has a downwardly projected enlargement which has an opening 13, at its base, which communicates with the opening 12 by way of the passage 14.

Each side of the said opening 12 has angle plates 15 and 16 welded thereto to form parallel recesses 17 and 18, respectively, adapted to provide guiding means for the trap door 19 which is provided therein for closing the openings 10 and 12, when rodent has entered therethrough into the passage 14.

As shown in Figure 4, the trap door 19 has one side thereof provided with a notch 20 adapted to be engageable by the latch member 21, which maintains said trap door 19, above the openings 10 and 12, in a suspended position. While one end of the latch 21 is engageable by the notch 20, its opposite end is pivotally connected at 22 to the platform 23. Said platform 23 has one end thereof pivotally connected, by the pin 24, to the side walls of the casing 11. Also, a spring 25 is provided between the platform 23 and the base wall of the casing 11 for the purpose of maintaining the latch 21 engaged within the notch 20.

It will be realized that the closing operation of the door 15 is effected by the coactive movement of the platform 23 and its associated latch member 21 into a downward direction which is caused by the weight of the rodent, when the same has mounted onto the platform 23.

Also, operating within the casing 11 is a barrel 26 adapted to be rotated by the expansion of the coil spring 27 on the shaft 28 which passes centrally through the openings provided in the plugs 29 and 30, respectively, which enclose said coil spring 27 within the chamber 31 of the barrel 26 and provide a rotative axis therefor. Such plugs 29 and 30 are rigidly connected to the shaft 28 which has each end thereof journaled in the side walls of the enlarged portion of the casing 11, as shown in Figure 5. The coil spring 27 has one end thereof fastened at 32 to the barrel 26 and its opposite end is fastened at 33 to the plug 29 which has its externally projected portion notched, to form a ratchet gear 34 adapted to be engageable by the catch member 35 which is pivotally secured, by the screw 36, to the side wall of the casing 11 and maintained thereon in a tensed position by the spring 37 which also is secured to the side wall of the casing 11 by the screw 38. Adjacent to the ratchet gear 34 and longitudinally to the side wall of the casing 11, the barrel 26 has rigidly secured to its end an L-shaped arm 39 operative to be rotated by the tension of the spring 37 which is windable by the handle 40 which is secured to the threaded end of the shaft 28 which projects to the external side of the garbage barrel 9.

In order to facilitate an automatic control to stop the L-shaped arm 39 at the point of each completed cycle of its rotation, for the purpose of exterminating several rodents successively by one winding of the coil spring 27, a lever 41 is provided longitudinally to the side wall of the casing 11 and pivotally secured thereto by the stud 42. While one end of lever 41 has a resilient latch 43 welded thereto at 44, its opposite end has a downwardly projected extension 45 being adapted for stopping or releasing the rotative movement of the arm 39. Under normal conditions, the lever 41 is maintained in its respective position by the spring 46 which has one end thereof secured to the side wall of the casing 11 by the screw 47 and has its opposite end secured at 48 to the lever 41.

Also, overlapping the catch projection 49, of the latch 43, is a second platform 50 being adapted to initiate, by the weight of rodent, the movement of the lever 41 into a downward direction and, thereby, causing disengagement of the extension 45 from the arm 39 which, by the rotative movement of the barrel 26, is impacted against the rodent, when the same is upon the platform 50. Such a platform 50 is pivoted on the pin 51 which is supported by the side walls of the casing 11. While the front end of the platform 50 is horizontally supported above the opening 13 by the spring 52, the counterbalancing rear end thereof is substantially angular thereto to conform with the inclined plane of the base of the passage 14 through which a rodent enters onto the platform 50 which is the zone for his extermination by the arm 39.

Connected to the platform 50, at 53, and connected to the trap door 19, at 54, is a flexible wire 55 passing over the studs 56 and 57, respectively, which are secured to the side wall of the casing 11. As a result, through the co-action of the force of impact of the arm 39 against the rodent, the platform 50 automatically disengages itself from the projection 49 and moves into a downward direction which causes the wire 55 to pull the trap door 19 into an upward position until the notch 20 is brought into alignment with the latch 21 for their engagement. The automatic disengagement of the platform 50, from the projection 49 of the latch 43 is effected by the stud 58 which forces the angularly-shaped end 59 of the latch 43 to move outward from the platform 50, when the movement of same is downward.

It will be realized that under a normal condition, the door 19 is maintained open until release thereof is effected by the weight of the rodent when the same has entered through the openings 10 and 12 and mounted the platform 23. When the avenue of retreat is closed by the door 19, the rodent in trying to escape, as could be expected, will follow the passage 14 and, as a result, will mount the second platform 50 and, thereby, by the weight thereof, effect the release of the arm 39 which, by the impact imparted by its rotation, will exterminate and then eject the said rodent therefrom into the garbage barrel 9.

Various changes are contemplated and may be resorted to provided they fall within the scope and spirit of the invention heretofore described and claimed in the appended claims.

We claim as our invention:

1. A device of the class described having a garbage receptacle, a casing within the garbage receptacle, a rotor within the casing, an arm connected to the rotor, a spring within the rotor to operate rotation of the arm to destroy several rodents successively, by one winding thereof, means to wind the spring, an entrance to admit rodents into the casing, said entrance being provided in the wall of the garbage receptacle, a slidable door carried by the casing to close the entrance when a rodent has been admitted therethrough, means to maintain the door normally open, a platform carried by the casing to operate said means to close the door by the weight of a rodent, a lever for controlling the unwinding operation of the spring throughout each cycle of rotation of the arm, said lever being carried by the casing, and means, operative by the weight of a rodent, to operate the lever to effect rotation of the rotor, to destroy rodent, by the rotative arm thereof.

2. A device of the class described having a barrel, a casing within the barrel, a rotor within the casing, an arm for destroying rodents being carried by the rotor, a spring being carried by the rotor to operate the arm to destroy several rodents successively, by one winding thereof, a handle means carried by the barrel for winding the spring, an opening to admit rodents into the casing, said opening being provided in the wall of the barrel, a slidable door carried by the casing to close the opening when a rodent has been admitted therethrough, means to maintain the door normally open, a platform carried by the casing to operate said means to close the door by the weight of a rodent, a lever for controlling the unwinding operation of the spring throughout each cycle of rotation of the arm, said lever being carried by the casing, a pivotal platform within the casing operative to move downward by the weight of rodent, a resilient latch carried by the lever and engageable by the platform to operate the lever for effecting the impact of the rotative arm against a rodent when the same is upon the pivotal platform, spring means urging engagement of the lever against the rotative arm to stop said arm for subsequent operation, and means operative by the arm to eject a rodent into the garbage barrel after its extermination.

3. A device of the class described having a barrel, a casing within the barrel, a rotor within the casing, an arm for destroying rodents being carried by the rotor, a spring being carried by the rotor to operate the arm to destroy several rodents successively, by one winding thereof, a handle means carried by the barrel for winding the spring, an opening to admit rodents into the casing, said opening being provided in the wall of the barrel, a slidable door carried by the casing to close the opening when a rodent has been admitted therethrough, means to maintain the door normally open, a platform carried by the casing to operate said means to close the door by the weight of a rodent, a lever for controlling the unwinding operation of the spring throughout each cycle of rotation of the arm, said lever being carried by the casing, a pivotal platform within the casing operative to move downward by the weight of rodent, a resilient latch carried by the lever and engageable by the platform to operate the lever for effecting the impact of the rotative arm against a rodent when the same is upon the pivotal platform, spring means urging engagement of the lever against the rotative arm to stop said arm for subsequent operation, means operative by the arm to eject a rodent into the garbage receptacle after its extermination, and a wire means between the door and the pivotal platform operative by the platform throughout the rotation of the arm to open the slidable door for the subsequent extermination of a rodent.

4. The combination of a garbage receptacle and a trap for rodents comprising a barrel, a casing within the barrel, said casing having an inlet for rodents and an outlet for ejecting exterminated rodents therethrough, a passage communicating with the inlet and the outlet, a rotor within the casing, an arm carried by the rotor, a spring carried by the rotor to operate the arm, including means for controlling the operation of arm to destroy several rodents successively by one winding of the spring, a slidable door to close inlet, means to maintain the door open, a pivotal platform to operate said means by the weight of a rodent to close the inlet, a second pivotal platform operative by the weight of rodent to effect its destruction by the impact of the rotative arm, and means operative by the rotation of the arm to open the door for the subsequent operation of the rodent trap.

5. The combination of a garbage receptacle and a trap for rodents comprising a barrel, a casing within the barrel, said casing having an inlet for rodents and an outlet for ejecting exterminated rodents therethrough, a passage communicating with the inlet and the outlet, a rotor within the casing, an arm carried by the rotor, a spring carried by the rotor to operate the arm, a lever having a projection forming a brake for stopping the rotation of the arm after each cycle of its revolution for controlling the operation of said arm to destroy several rodents successively by one winding of the spring, a slidable door to close said inlet, means to maintain said door open, a pivotal platform to operate said means by the weight of a rodent to close the inlet, a second pivotal platform operative by the weight of said rodent to effect the destruction of said rodent by the impact of said rotative arm, and a cable engageable by the second platform and said door, said cable being operative by the rotation of said arm to open the door for the subsequent operation of the rodent trap.

6. The combination of a garbage receptacle and a trap for rodents comprising a barrel, a casing within the barrel, said casing having an inlet for rodents and an outlet for ejecting exterminated rodents therethrough, a passage communicating with the inlet and the outlet, a rotor within the casing, an arm carried by the rotor, a spring carried by the rotor to operate the arm, a lever having a projection forming a brake for stopping the rotation of the arm after each cycle of its revolution for controlling the operation of said arm to destroy several rodents successively by one winding of the spring, a slidable door to close said inlet, a pivotal platform having a pivotal latch engageable by a notch provided in said door for maintaining said door in a suspended position for having the inlet into said casing open for the admittance of rodents thereinto, a spring between said casing and said platform for maintaining said latch engageable within said notch of said door, said pivotal platform being operative by the weight of a rodent to close the inlet, a second pivotal platform operative by the weight of said rodent to effect the destruction of said rodent by the impact of the rotative arm, and a cable engageable by the second pivotal platform and the said door, said cable being operative by the rotation of said arm to open the door for the subsequent operation of the rodent trap.

7. As in claim 6, in which said lever having a resilient latch operative by the downward movement of the second pivotal platform resulting from the weight of a rodent for causing the disengagement of the brake from said arm to effect its rotative operation.

HERBERT TSAI.
NICHOLAS CHUY.

REFERENCES CITED

The following references are of record in the file of this patent:

UNITED STATES PATENTS

| Number | Name | Date |
|---|---|---|
| 1,198,332 | Crisler | Sept. 12, 1916 |
| 1,943,177 | Harris | Jan. 9, 1934 |